(12) United States Patent
Ryan

(10) Patent No.: US 6,314,917 B1
(45) Date of Patent: Nov. 13, 2001

(54) RETRACTABLE LEASH PACK

(75) Inventor: Timothy Ryan, Boulder, CO (US)

(73) Assignee: Ryan Product Marketing, Boudler, CO (US)

( * ) Notice: Subject to any disclaimer, the term of this patent is extended or adjusted under 35 U.S.C. 154(b) by 0 days.

(21) Appl. No.: 09/526,340

(22) Filed: Mar. 13, 2000

(51) Int. Cl.⁷ ................................................... A01K 27/00
(52) U.S. Cl. ............................................................. 119/796
(58) Field of Search ....................................... 119/794, 796

(56) References Cited

U.S. PATENT DOCUMENTS

| 5,680,958 | * | 10/1997 | Mann et al. | 220/739 |
| 5,890,456 | * | 4/1999 | Tancrede | 119/794 |

OTHER PUBLICATIONS

Product Catalog: The Real Boss, Inc., Bedford, MA 01730, 12 pages.

* cited by examiner

Primary Examiner—Charles T. Jordan
Assistant Examiner—Jordan M Lofdahl
(74) Attorney, Agent, or Firm—Lathrop & Gage L.C.

(57) ABSTRACT

The retractable leash pack of the invention is a compartmentalized pack—made of typical back pack materials such as Nylon, webbing, mesh and VELCRO®—that fits securely to a retractable dog leash. The various compartments provide for carrying dog waste, waste disposal bags, treats, keys, wallets and other items. A user of the invention can walk her dog and carry necessary items in a single pack coupled to the leash. The compartments are typically closed and/or contained by various known methods, including via zippers, buttons, snaps, mesh pouches, and pockets. In one preferred aspect, one side of the pack has another compartment that expands to allow for convenient storage of dog waste, such as collected within waste disposal bags over time.

4 Claims, 2 Drawing Sheets

RETRACTABLE LEASH PACK

BACKGROUND OF THE INVENTION

Dog leashes and animal sanitation devices are known in the art. Leashes generally provide for attachment between a dog and an owner, and the sanitation devices provide for storing animal waste. The prior art is for example familiar with enhanced dog leashes and with pet sanitation devices as set forth in the following patents, each of which is hereby incorporated by reference: U.S. Pat. No. 5,441,017 describes a pet leash with an integral waste bag dispenser; U.S. Pat. No. 5,560,321 describes an animal harness for dispensing litter bags; U.S. Pat. No. 5,363,809 describes a pet sanitation article attachable to a leash assembly; and U.S. Pat. Nos. 5,054,828 and 4,909,553 describe dog feces disposal implement kits.

Retractable dog leashes are also known in the art. These leashes provide for variable attachment, in distance, between a pet and the owner. Improvements to leashes and sanitation devices are desirable; and one object of the invention is to provide a new and improved retractable leash pack system.

These and other objects will be apparent in the description which follows.

SUMMARY OF THE INVENTION

The retractable leash pack of one aspect of the invention is a compartmentalized pack—made of typical back pack materials such as Nylon, webbing, mesh and VELCRO®—that fits securely to a retractable dog leash. The various compartments (typically at least one, though two or more are also within the scope of the invention) provide for carrying dog waste, waste disposal bags, treats, keys, wallets and other items. Accordingly, a user of the invention can walk her dog and carry necessary items in a single pack coupled to the leash. The compartments are typically closed and/or contained by various known methods, including via zippers, buttons, snaps, mesh pouches, and pockets. In one preferred aspect, one side of the pack has another compartment that expands to allow for convenient storage of dog waste, such as collected within waste disposal bags over time.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
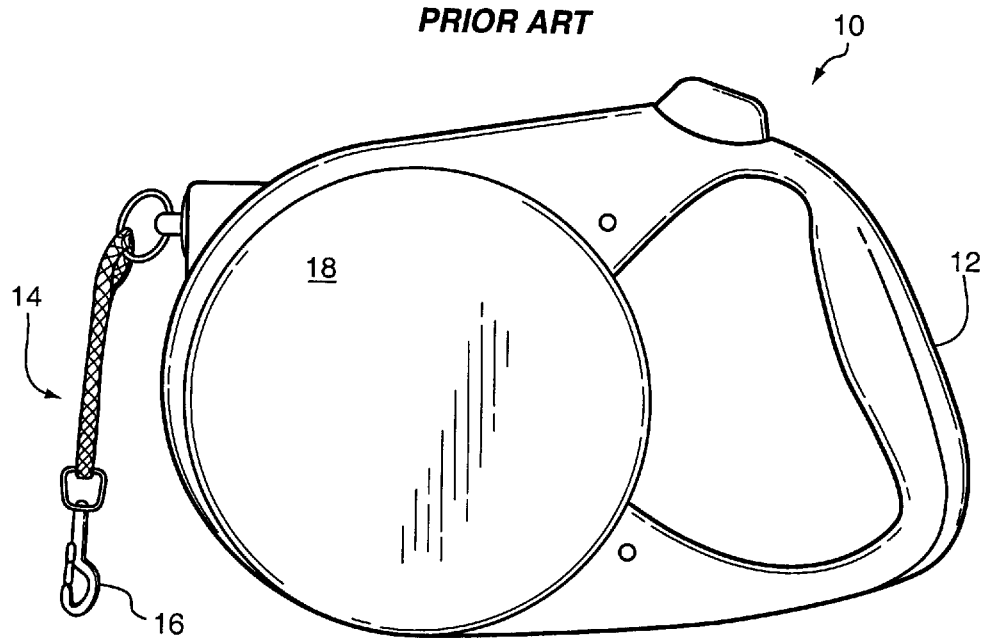
FIG. 1 illustrates a typical prior art retractable pet leash.

FIG. 1 shows a prior art retractable pet leash system 10 manufactured by FLEXI. A user holds the leash 10 by handle 12; and leash end 14 has a clasp 16 to couple to a pet's collar. Leash end 14 can extend away from system 10 by operation of internal coiling (not shown, but known in the art) within system housing 18.

Figure 2:
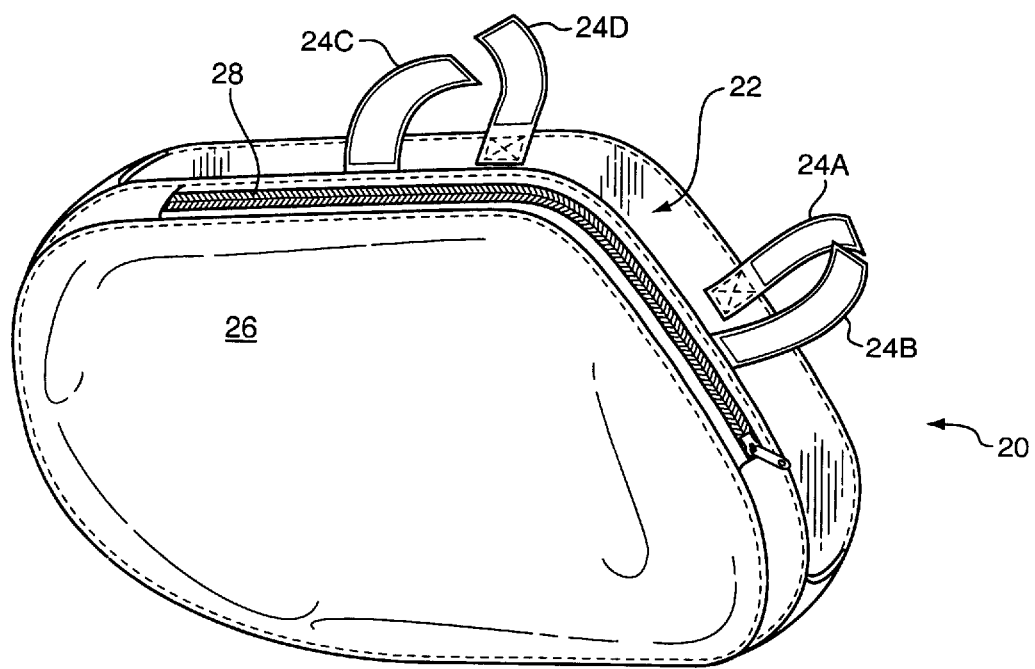
FIG. 2 shows a retractable leash pack constructed according to the invention.

FIG. 2 illustrates a leash pack 20 constructed according to the invention. A retractable leash such as shown in FIG. 1 fits within the interior pocket 22 of pack 20 such that housing 18 is held in place by VELCRO straps 24 (i.e., strap 24a couples to strap 24b; strap 24c couples to strap 24d) and such that handle 12 extends from pack 20 in normal use (illustrated in more detail in FIG. 3).

Pack 20 is made from typical backpack materials, such as Nylon, canvas or other suitable, environmentally strong materials. FIG. 2 also illustrates one compartment 26, which is closed by zipper 28. A user of pack 20 can thus store items, selectively, within compartment 26.

Figure 3:
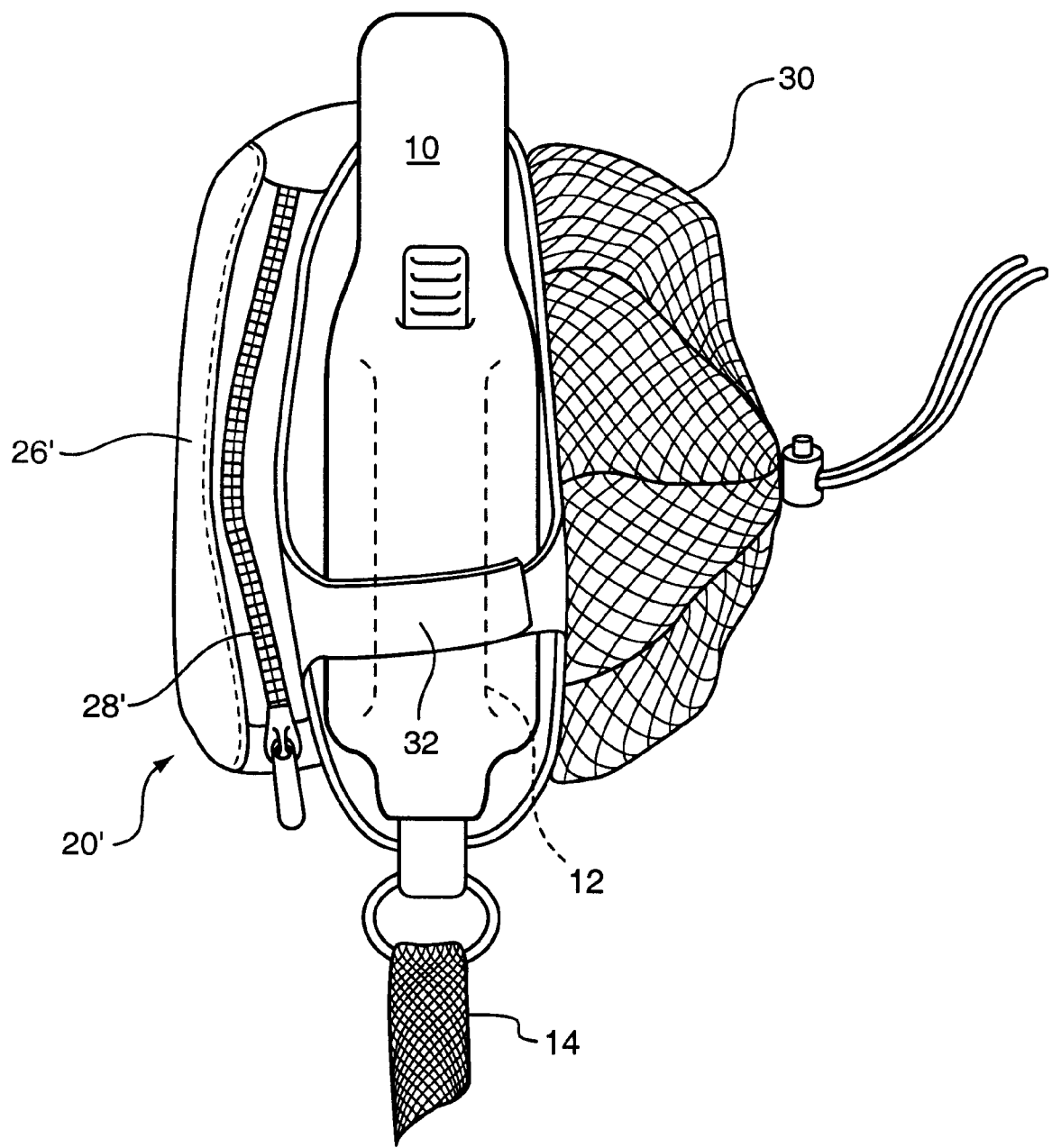
FIG. 3 shows another retractable leash pack constructed according to the invention.

FIG. 3 illustrates an alternative leash pack 20', which is similar to pack 20 except that web compartment 30 is also included on the other side of pack 20'. Pack 20' utilizes only one VELCRO strap 32 to hold the retractable leash 10 in place (handle 12 extends out away from the leash 10 and strap 32 and is thus illustrated by a dotted line). Pack 20' preferably includes a zippered compartment 26', as above, with zipper 28'. Web compartment 30 is preferably expandable to accommodate pet waste added to compartment 30 over time, such as during a long walk with the pet. Compartment 26' can house, for example, waste disposal bags, wallets, keys, etc.

Those skilled in the art should appreciate that other compartments can be included within packs 20, 20', to house other items of interest to the user.

In view of the foregoing, what is claimed is:

1. A retractable leash pack, comprising: a pocket for housing a retractable leash, the pack coupling to the leash such that the user has access to normal operation of the leash;

one or more VELCRO straps to contain the leash in the pocket; and a compartment for storing items.

2. A retractable leash pack, comprising: a pocket for housing a retractable leash, the pack coupling to the leash such that the user has access to normal operation of the leash;

a compartment for storing items; and a zipper to close the compartment.

3. A retractable leash pack, comprising: a pocket for housing a retractable leash, the pack coupling to the leash such that the user has access to normal operation of the leash;

an expandable web compartment for storing used disposable waste bags over time; and a compartment for storing items.

4. A leash pack of claim 3, wherein the compartment comprises expandable web material.

* * * * *